UNITED STATES PATENT OFFICE.

PAUL SIEVERT, OF DEUBEN, GERMANY.

PROCESS OF DISSOLVING WATER-GLASS.

SPECIFICATION forming part of Letters Patent No. 445,091, dated January 20, 1891.

Application filed March 26, 1890. Serial No. 345,406. (No specimens.)

*To all whom it may concern:*

Be it known that I, PAUL SIEVERT, a subject of the King of Saxony, residing at Deuben, near Dresden, in the German Empire, have invented certain new and useful Improvements in the Production of Solution of Alkaline Silicate or Water-Glass, of which the following is a specification.

The well-known and usual process of dissolving water-glass mainly consists in mixing the material—such as is supplied by the trade in lumps or powder—with water and treating it for several hours by steam in suitable chambers, during which treatment it is continually stirred. This process, however, can only be carried out at a profit by means of an extensive industrial plant where the requisite machinery is within easy reach. In addition to this another difficulty arises in practicing this method—viz., that owing to the glass being boiled in the water for a considerable length of time the solution becomes turbid, probably in consequence of the formation of acid silicates, and therefore requires subsequent fining or clarifying, which of course involves a loss of time. It is for this reason that in many industries, and notably in the soap manufacture, water-glass is purchased directly in solution; but this has the disadvantage of unnecessarily increasing the cost of warehousing and treatment, seeing the considerable percentage of water which is contained in water-glass supplied in this form, besides a variety of other drawbacks.

Now, the object of this invention is a process which will enable water-glass to be purchased by manufacturers in lumps and a solution of the required strength to be obtained on the spot without necessitating any special provision, steam being the only agent required, and this being in most cases constantly at hand, as is well known.

This novel process mainly consists in first softening (partly dissolving) the lumps of water-glass by intimate contact with the steam and then constantly moistening them by means of a spray of water or any suitable alkaline lye, while the solution is discharged and collected as it forms. By causing the solution before it is discharged to flow a greater or less distance over the softened lumps it can be made more or less rich at will.

This process also offers this important advantage, that the solution thus continuously produced at the desired degree of strength or richness is perfectly clear and can at once be used for any industrial purpose. This may be accounted for by the fact that the formation of acid silicates, which cause the turbidness, may be avoided by placing the water-glass in direct contact, if even for a moment only, with the water or lye. This, however, is only possible when the pieces of glass are previously by an intimate contact with steam made capable of a rapid dissolution.

In carrying out this process the lumps or pieces of water-glass are preferably formed in a high pile or heap in a perforated vessel, and then treating the pile with a stream of steam discharged thereon under pressure and a spray of water or a suitable alkaline lye, and the solution formed is continuously discharged as it forms and acquires the desired degree of richness by flowing over the surfaces of the lumps of water-glass on its way to the discharge-orifice.

I claim—

The herein-described mode of producing a clear solution of water-glass, consisting in placing the lump water-glass in a vessel and forming the same into a pile, discharging a stream of steam forcibly against said lump water-glass, and thereby softening and partially dissolving the same, and treating the same with a spray of alkaline lye, the solution being richened by flowing over the undissolved glass lumps on its way to the discharge, and the solution being continuously discharged as it forms, as set forth.

In testimony thereof I have hereunto set my hand in presence of two witnesses.

PAUL SIEVERT.

Witnesses:
 RIC'D. SCHMIDT,
 PAUL DRUCKMÜLLER.